United States Statutory Invention Registration [19]

[11] Reg. Number: H500

Stogner et al.

[43] Published: Aug. 2, 1988

[54] EXHAUST NOZZLE FLAP ASSEMBLY

[75] Inventors: Claude R. Stogner, Palm Beach Gardens; William M. Madden, Palm Springs, both of Fla.

[73] Assignee: The United States of America as represented by the Secretary of the Air Force, Washington, D.C.

[21] Appl. No.: 19,996

[22] Filed: Feb. 27, 1987

[51] Int. Cl.[4] ..... B64C 15/04

[52] U.S. Cl. ..... 239/265.25

[58] Field of Search ..... 239/265.19, 265.25, 239/265.27, 265.29, 265.31, 265.33, 265.35, 265.37; 60/228, 229, 230, 232, 226.2

[56] References Cited

U.S. PATENT DOCUMENTS

| | | | |
|---|---|---|---|
| 3,598,320 | 8/1971 | Babin | 239/265.25 |
| 4,605,169 | 8/1986 | Mayers | 60/229 |
| 4,690,329 | 9/1987 | Madden | 60/230 |

FOREIGN PATENT DOCUMENTS

| | | | |
|---|---|---|---|
| 2164613 | 3/1986 | United Kingdom | 239/265.35 |

*Primary Examiner*—Charles T. Jordan
*Assistant Examiner*—Michael J. Carone
*Attorney, Agent, or Firm*—Thomas L. Kundert; Donald J. Singer

[57] ABSTRACT

A high strength, lightweight exhaust nozzle flap assembly (22) includes a first flap (26) with integral sidewall disks (34, 35) for imparting moments (72, 73) to a cantilevered flap (26) for reducing the mid span deflection of the flap (26) due to internal nozzle static gas pressure. A second flap (42) is also provided with thrust bearings (80, 81) for establishing a combined structure with further resistance to deflection.

5 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

73
72
74
P
75
P
62
26

L
O

L
O
L/2
76

L
O
L/2
78

52
54
P
55
P
26'

L
O

L
O

L
O
60
L/2

EXHAUST NOZZLE FLAP ASSEMBLY

RIGHTS OF THE GOVERNMENT

The invention described herein may be manufactured and used by or for the Government of the United States for all governmental purposes without the payment of any royalty.

FIELD OF THE INVENTION

The present invention relates to a flow diverting flap assembly in a gas turbine engine exhaust nozzle arrangement.

BACKGROUND

The use of flaps to divert normally axially flowing exhaust gases from a propulsion gas turbine engine in an aircraft application is well known. Such flaps are typically pivoted or otherwise positioned to selectably divert at least a portion of the exhaust gases to provide thrust vectoring for increased maneuverability and/or lift.

As with any aircraft related component, such vectoring exhaust nozzles and flaps are desirably designed to be relatively light in weight as compared to non-aircraft structures subject to similar pressure or stress loading.

For simply supported flaps having a spanwise orientation transverse to the exhaust gas stream, the gas static pressure at the flap surface results in a large bending moment at the flap midspan which is hence the point of maximum flap deflection.

In modern, high performance nozzles wherein the gas static pressure loading and mechanical complexity are increased over prior art nozzle designs, it is not uncommon to have a diverting flap which, although adequate in material strength to withstand the gas dynamic and static forces during nozzle operation, is elastically deflected by such forces to a degree which results in interference between the moving flap and surrounding nozzle components. Such flap designs must be modified to reduce the midspan deflection by increasing the cross span moment of inertia and hence the weight and/or cross sectional thickness of the flap. Modifications of this type result in an even further understressed flap design which is heavier and bulkier than desired for optimum performance.

SUMMARY OF THE INVENTION

It is therefore an object of the present invention to provide a lightweight, movable flap assembly for a thrust vectoring nozzle for a gas turbine engine exhaust.

It is further an object of the present invention to provide a flap assembly which is resistive to excessive deflection under exhaust gas static pressure loading.

It is further an object of the present invention to provide a flap assembly wherein the individual components are cooperatively linked to withstand the aforementioned static pressure loading.

It is still further an object of the present invention to provide a flap design which may be optimized to accommodate the exhaust gas static pressure loading for a variety of flap spans and gas pressures.

According to the present invention, a vectoring exhaust nozzle for a gas turbine engine is provided with at least one flap assembly for diverting the exhaust gas flow. The flap assembly includes a first flap pivotable about a pivot axis oriented transversely with respect to the engine centerline axis and spaced apart therefrom.

The first flap further includes a pair of opposite sidewall disks, secured to the span ends of the first flap which is supported therebetween in a cantilever relationship.

By offsetting the first flap from the pivot axis, the assembly according to the present invention induces a resultant moment at each of the span ends of the first flap through the corresponding sidewall disk due to the force of the internal exhaust gas pressure on the inward facing disk surfaces. The resultant moments oppose the midspan bending moment created in the first flap by the pressure of the exhaust gas thereon, reducing the deflection of the first flap midspan from that of a simply supported flap.

This reduction in deflection is further limited in the case of a nozzle having a second, semi-cylindrical flap disposed outward of the first flap and pivotable about a common pivot axis therewith. This arrangement, particularly well suited for nozzles wherein the first flap is pivotable into a blocking orientation with respect to the axially flowing exhaust gases, provides support to the first flap via two thrust bearings disposed between the flaps and proximate the first flap span ends. The nested two flap assembly provides a structure which is limited by the stresses induced in the individual components rather than the maximum relative deflection which can be accommodated.

The design is thus lighter in weight than prior art, simply supported flap assemblies which require overstrengthening to avoid excessive elastic deflection in the components. Both these and other objects and advantages of the flap assembly according to the present invention will be apparent to those skilled in the art upon review of the following specification and the appended claims and drawing figures.

DETAILED DESCRIPTION OF THE PREFERRED EMBODIMENT

Figure 1:
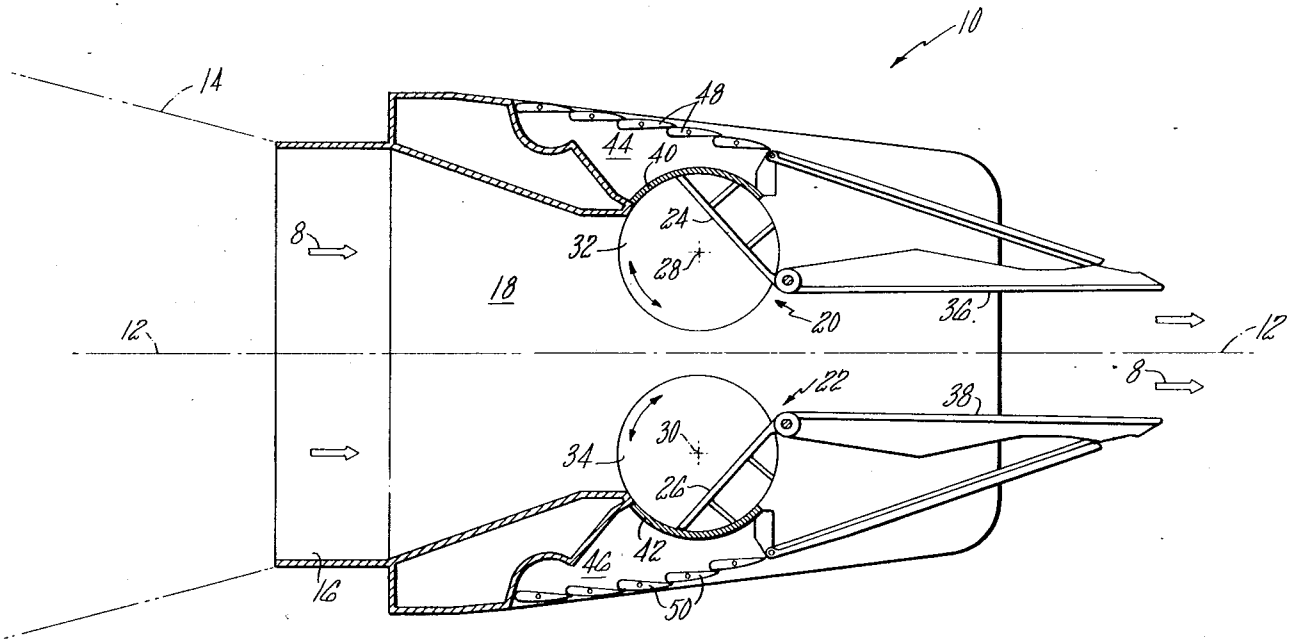
FIG. 1 shows a section of an exhaust nozzle for a gas turbine enqine taken in the plane of the engine centerline and showing the arrangement of the flaps therein.

FIG. 1 shows a sectional view of an exhaust nozzle 10 taken through the centerline 12 of a gas turbine engine 14 shown in phantom. The nozzle 10 is of the 2-D type wherein the typically circular engine exhaust is conducted into a rectangular flow passage by a transition section 16 disposed at the forward end of the nozzle 10.

The nozzle 10 further includes a pair of spaced apart, lateral sidewalls, one of which 18 is shown in FIG. 1 and upper and lower flap assemblies 20, 22 which respectively define portions of the upper and lower nozzle gas flow path.

In the nozzle arrangement of FIG. 1, the flap assemblies 20, 22 comprise first flaps 24, 26 which are oriented spanwisely so as to extend transversely across the axially flowing gas stream 8. The first flaps 24, 26 are each pivotable about a corresponding pivot axis 28, 30 whereby the flaps 24, 26 may be selectably positioned to divert the exhaust gases 8 for thrust vectoring or outlet gas velocity regulation.

As will be discussed more fully hereinbelow, the first flaps 24, 26 are secured at the span ends thereof to corresponding sidewall disks 32, 34 which are mounted substantially flush with the corresponding nozzle sidewall 18 and define therewith a portion of the lateral exhaust gas flow boundary.

An aftward pair of divergent flaps 36, 38 are shown in FIG. 1 for the purpose of fully disclosing the environment within which the flap arrangement according to the present invention is utilized. The divergent flaps 36, 38 are positioned independently of the first flaps 24, 26 and function to direct and expand the exiting exhaust gases as required by the current engine and aircraft operating conditions.

The exhaust nozzle 10 includes a pair of second flaps 40, 42 which are each semicircular and disposed both outward and adjacent to the respective first flaps 24, 26. In the particular nozzle arrangement shown in FIG. 1, the second flaps 40, 42 control the admission of the exhaust gases 8 into corresponding reversing gas flow ducts 44, 46. During periods wherein reverse thrust is desired, the first flaps 24, 26 are rotated into the exhaust gas flow 8 until both are oriented nearly perpendicular to the engine centerline 12 at which time the second flaps 40, 42 are rotated aftward for admitting the engine exhaust gases 8 into the reversing ducts 44, 46 whence the diverted exhaust gases are directed by the corresponding cascade of adjustable vanes 48, 50.

As will be appreciated by those skilled in the art of supersonic and high performance gas turbine engine vectoring nozzles, the internal differential pressure may be 50 psi (345 kPa) or higher depending on the operating configuration. The gas path defining structure, including the sidewalls 18, sidewall disks 32, 34, and flaps 24, 26, 40, 42, must withstand this elevated pressure loading without overstressing the materials or structure and without experiencing excessive deflection which may result in interference between moving components or other undesirable effects. FIGS. *3a–d* illustrate the effect of such high pressure loadings on a simply supported flap 26' of the prior art.

FIG. *3a* is a free diagram showing a uniform static pressure load 52 distributed over the span of the prior art flap 26' and counterbalanced by two equal reactive forces 54, 55 at the span ends of the flap 26'. FIG. *3b* is a graphic representation of the shear force present in the flap 26' over the span length L. This diagram is typical for a simply supported, uniformly loaded beam or the like.

FIG. *3c* represents the variation of the moment in the flap 26' over the span length L. The moment is 0 at the span ends of the flap 26' as is consistent with simply supported beam structures, rising to a maximum at the midspan, L/2, which coincides with the point of maximum deflection 60. As noted above, such behavior is typical for simply supported structures such as the prior art flap 26'.

It is important to note at this point that such flap structures 26' may experience an undesirably large midspan deflection resulting from the gas static pressure load without concomitantly experiencing an overstress in any part of the structure of the flap 26'. Such designs, termed "deflection-limited" require such simply supported flaps to be strengthened to resist such deflection, typically by adding heavier or stiffer material to the flap structure, increasing the cross sectional moment of inertia of the flap, or both. Such solutions, while effective in reducing the magnitude of the maximum deflection of a simply supported flap, add size and/or weight to the flap component thereby reducing the attractiveness of such designs for high performance aircraft applications.

Figure 2:
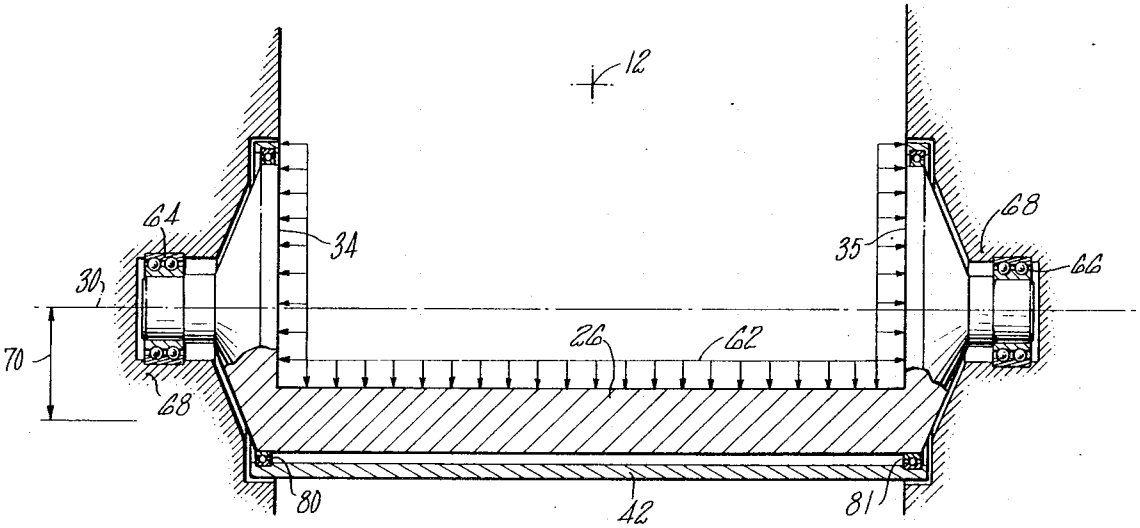
FIG. 2 shows a spanwise section of the flap assembly according to the present invention.
Figures 3A, 3B, 3C, 3D, 4A, 4B, 4C, 4D:
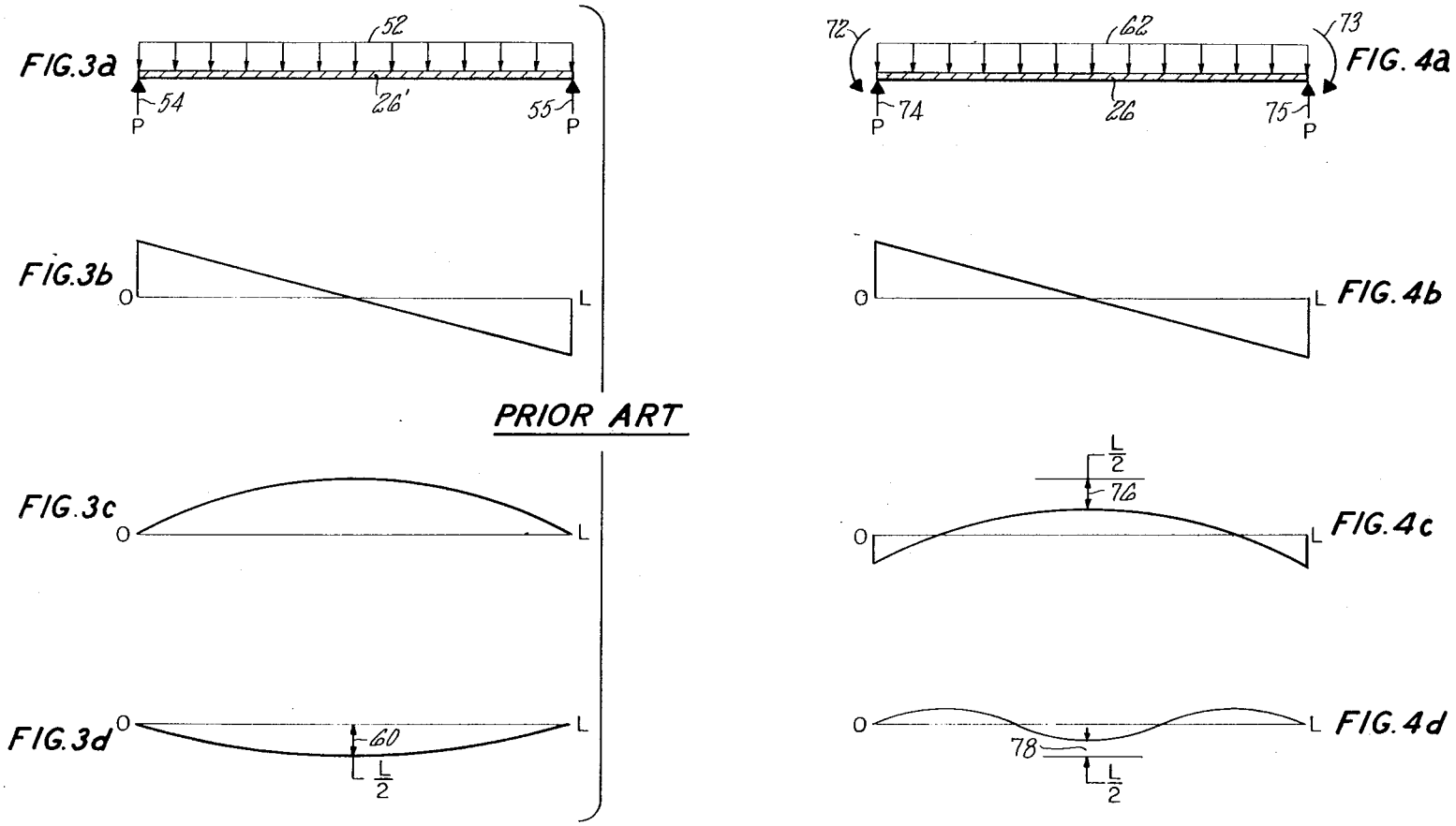
PRIOR ART FIG. 3a
FIGS. 3*a–d* show a free body diagram of a simply supported flap and the resulting spanwise variation in shear moment and flap deflection.
FIGS. 4*a–d* show a free body diagram of the diverter flap from a flap assembly according to the present invention and the resulting spanwise variation in flap shear, moment, and deflection.

FIG. 2 shows a sectional view of a first flap 26 taken in the plane of the pivot axis 30. It is to be understood that the first flap 26 may be incorporated in an exhaust nozzle 10 either singly or as one of a pair of symmetric flap assemblies 20, 22 as shown in FIG. 1. A flap 26 is shown cantilevered between spaced apart, opposite facing sidewall disks 34, 35 which in turn are pivoted about the pivot axis 30 which is in turn oriented transversely with respect to the engine axis 12 and spaced apart therefrom. The static pressure loading 62 caused by the elevated pressure exhaust gas in the nozzle acts to force the sidewall disks 34, 35 laterally outward as well as to push the flap 26 downward as shown in FIG. 2. The sidewall disks 34, 35 are supported by bearing structures 64, 66 which are in turn simply supported at 68 by the nozzle static structure (not shown).

The first flap 26 is further offset a distance indicated at 70 with respect to the pivot axis 30 for providing a reactive moment at the span ends of the flap 26 due to the outward pressure force on the integral sidewall disks 34, 35. This offset 70 may be increased or decreased by the nozzle designer to provide the desired magnitude of reactive moment at the span ends to reduce the maximum mid span flap deflection as discussed hereinbelow.

The effect of the reactive moments 72, 73 are illustrated in FIGS. *4a–d* wherein *4a* shows a free body diagram of the first flap 26 according to the present invention. The flap 26 is supported in a cantilever relationship at the span ends thereof which are resolved in FIG. *4a* into pairs of equal reactive forces 74, 75 and moments 72, 73. The uniform flap pressure loading 62 is also shown.

FIG. *4b* shows the variation of the shear force over the length of the flap span L and is similar to that of the simply supported prior art flap as shown in FIG. *3b*.

FIG. *4c*, however, illustrates the effect of the resultant moments 72, 73 imposed on the span ends of the flap 26 in the integral disk-flap-disk arrangement according to the present invention. The negative moments imposed at the span ends directly reduce the maximum moment 76 occurring at the flap midspan. The modified moment distribution in the flap 26 according to the present invention alters the deflection mode of the flap as shown in FIG. *4d*, providing a substantial reduction 78 in the maximum deflection of the flap. It should be noted that for the purposes of comparison in this discussion, the crosswise moment of inertia of both the prior art flap 26' and the flap 26 according to the present invention are equivalent.

It is thus clear that the first flap assembly according to the present invention achieves a reduced maximum deflection under gas static pressure loading as compared to a simply supported flap of the prior art. In practical terms, and for deflection limited flap designs, the flap arrangement according to the present invention is able to achieve a desired maximum deflection with a comparatively lightweight structure.

A further feature of the flap assembly according to the present invention, particularly suited for the two flap, nested assembly 20, 22 as shown in FIG. 1, is illustrated in FIG. 2 wherein the second, semi-cylindrical flap structure 42 is shown disposed adjacent the first flap 26 and rotatable about a common pivot axis 30 therewith. The arrangement according to the present invention includes a pair of thrust bearings 80, 81 disposed proximate the span ends of the first flap 26 for preventing relative movement between the respective span ends of the first and second flaps 26, 42.

As will be apparent to those skilled in the art of structural design, the linking of the first and second flaps 26, 42 in this fashion creates a structure with a greater spanwise rigidity and crosswise moment of inertia. The nested, linked flaps 26, 42 thus cooperate to strengthen the combined structure and better enable each flap component to resist deflection under static pressure loading from the exhaust gas. Such static pressure loading attempts to induce an outward bowing of the individual flap members perpendicular to the individual flap spans resulting in the thrust bearings 80, 81 imposing a compressive force on the first flap 26 and a tensile force on the second flap 42. As the second flap 42 is typically designed as a thin section with a relatively small cross span moment of inertia, it is better suited to withstand a combined bending and tensile stress as opposed to merely a bending stress which would result if the bearings 80, 81 allowed free spanwise translation of the second flap span ends.

The combined effect of the integral sidewall disk and offset first flap component and the concentric, semicylindrical second flap 42 supported by thrust bearings 80, 81 results in a lightweight, strong flap assembly 22 as compared to prior art simply supported designs. The combined structure is in fact stronger than the individual parts thereof allowing a greater reduction in overall nozzle structure weight than would be achieved merely by modification of individual, independent components. In conclusion, it should be noted that the above descriptions are intended to illustrate only one embodiment of the flap assembly according to the present invention which may be configured in a variety of equivalent arrangements without departing from the spirit and scope thereof.

We claim:

1. A nested flap assembly for a 2-D, thrust vectoring gas turbine engine exhaust nozzle having an axially flowing stream of engine exhaust gas passing therethrough, comprising:

first and second transversely oriented, flow directing flaps, each flap being pivotable about a common pivot axis oriented transversely with respect to the exhaust gas stream;

the first flap being generally planar in shape and further being offset with respect to the common pivot axis and selectively pivotable about the common pivot axis for redirecting the flowing exhaust gases, the second flap being semi-cylindrical in shape for nestingly receiving the first flap therewithin, the second flap further being pivotable about the common pivot axis for selectably opening and closing an alternate exhaust gas flow path within the exhaust nozzle; and first and second thrust bearings, disposed between the first and second flaps proximate the span ends thereof and adapted to prevent relative transverse displacement between the respective span ends of the first and second flaps.

2. The flap assembly as recited in claim 1, wherein the first flap further comprises:

first and second sidewall members, each secured to the opposite span ends of the first flap and oriented perpendicular thereto, the first and second sidewall members further each extending between the respective first flap span end and the common pivot axis and the first flap further being cantilevered therebetween for receiving any bending moment produced by an outward internal nozzle static pressure force exerted against the sidewall members.

3. The flap assembly as recited in claim 2, wherein the sidewall members are sized to produce a resultant moment at the first flap span ends sufficient to negate any midspan deflection induced in the first flap by the exhaust gas static pressure force exerted thereon.

4. A flap assembly for a gas turbine engine exhaust nozzle, comprising:

an exhaust gas flow directing flap extending spanwisely across the exhaust gas flow, the flap being cantilevered between two opposed sidewall disks rotatable about a common pivot axis oriented transversely with respect to the exhaust gas flow and spaced apart from the flow directing flap surface; and wherein the sidewall disks and flap form an integral pivotable member having opposing resultant moments induced therein at each span end of the flap in response to a static exhaust gas pressure on the sidewall disks.

5. The flap assembly as recited in claim 4, wherein, the sidewall disks are pivotably supported in a pair of corresponding bearings.

* * * * *